March 11, 1930.  W. LUBACH  1,749,826
ELECTRIC HYGROMETER
Filed June 7, 1927
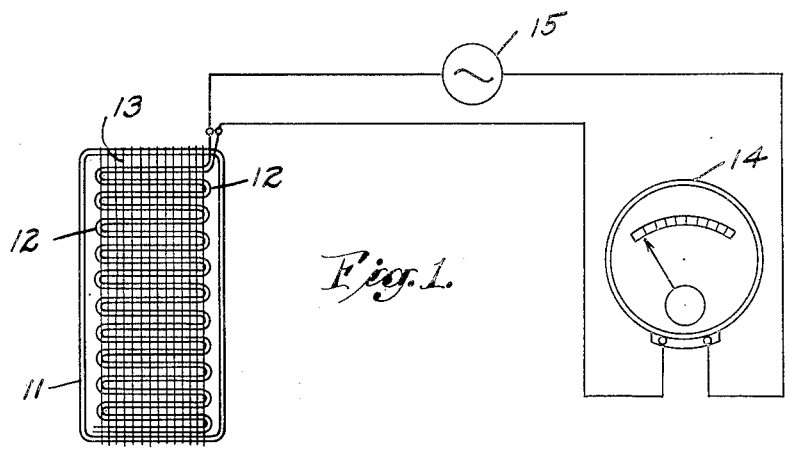
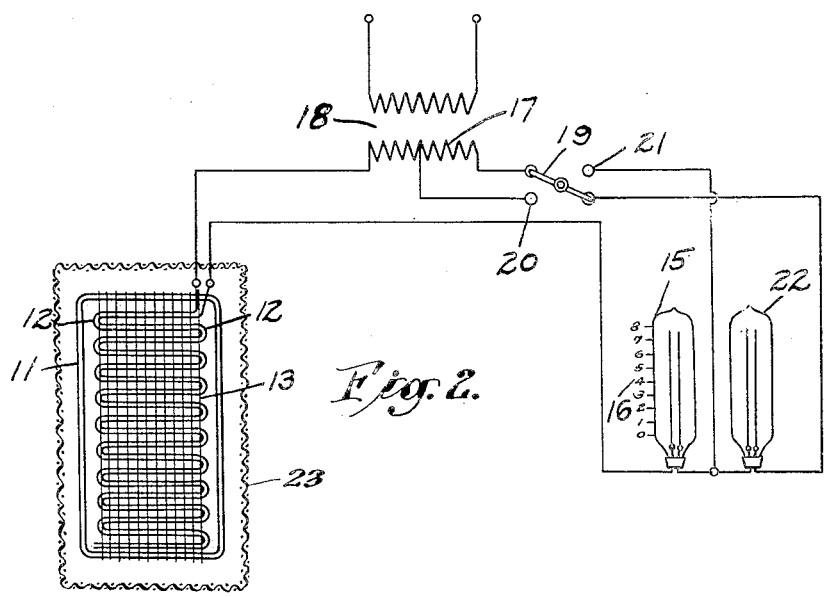
INVENTOR
Walter Lubach
by John Flam
ATTORNEY Patented Mar. 11, 1930

1,749,825

UNITED STATES PATENT OFFICE

WALTER LUBACH, OF BERLIN, GERMANY

ELECTRIC HYGROMETER

Application filed June 7, 1927, Serial No. 197,197, and in Germany June 8, 1926.

This invention relates to the detection or measurement of moisture, and especially to an electrical system whereby the moisture in a room or in a liquid can be determined.

In the past, hygrometers of this type generally utilized material capable of soaking up moisture, such as paper, pressboard or asbestos, and the variations in electrical resistance thereof due to variations in moisture were used to affect an electric measuring circuit. In such systems, however, the material could not respond quickly to variations in humidity, since the drying out of the material once it is saturated is difficult. For this reason, a considerable lag is introduced into the instrument that renders it unsuitable for many purposes, since artificial drying would have to be resorted to over a long period of time.

It is accordingly one of the objects of my invention to provide a hygrometer that is free from these defects.

It has been found that by using material that simply serves as a body upon which moisture can collect, but which is impervious thereto, the hygrometer can be made to respond accurately and rapidly to variations in humidity. Such material for example are glass, porcelain, glass wool, hard rubber, or a phenolic condensation product or its equivalent. It is thus another object of my invention to provide a hygrometer using such impervious material for collecting the moisture to affect an electric controlling or measuring circuit.

It is still another object of my invention to improve in general, electric hygrometers of this class.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a schematic diagram illustrating my invention in connection with an ordinary electric galvanometer measuring instrument; and Fig. 2 is a similar diagram showing my invention applied to a different form of measuring device.

In both forms I show a support 11 in a developed form, it being understood that it can be rolled up to form a cylindrical member. On this support are located a pair of closely spaced, convoluted conductors 12 which are not in direct electrical contact. These wires are preferably made from nichrome. Adjacent the wires and bridging them in many places is a quantity of glass wool 13, which is evenly distributed so as to provide a multiple of paths between the wires 12 when moisture collects thereon. The wires 12 are connected, in Fig. 1, directly in series with the measuring and indicating instrument 14, and a source of constant potential 15.

When moisture collects on the glass wool 13, it remains nonconductive; but it serves as a carrier of the moisture collected, to form thereby electrical connections between the wires 12. The strength of the current is proportional to the humidity or moisture thus taken up by the glass wool 13. The glass wool web follows every change in the humidity of the air or other fluid immediately and without lag, as the collected moisture does not penetrate the glass wool and is free to evaporate and recondense in accordance with the humidity conditions to be measured. The instrument 14 can easily be calibrated to indicate percentage humidity directly.

The size and length of the wires 12 and the amount of glass wool can be chosen in accordance with the degree of sensibility desired; and the measuring instrument 14 can also be chosen with this in mind. When however, large values of humidity are to be measured, the measuring apparatus such as that shown in Fig. 1 may become too expensive and bulky. In the arrangement of Fig. 2 I show a measuring device that is more suitable for such purposes, whereby its field of application is widened. As a measuring instrument, use is made of a gas filled cathode ray lamp 15, in which there are two parallel electrodes. As the humidity varies, the current flow between the electrodes varies, and this in turn causes the volume of light glow to vary in extent. The greater the current, the farther up the light discharge extends along the electrodes. Thus by noting this distance on a scale 16, the degree of humidity can be determined.

In this instance, the source of electrical energy for operating the system is the secondary winding 17 of a transformer 18. By the aid of switch 19 it is possible to vary the current flow by tapping transformer winding 17. Thus when only a portion of the turns of secondary 17 is rendered active, as by rotating switch 19 in a counterclockwise position to connect contacts 20 and 21, only tube 15 is in circuit. This may be satisfactory for one portion of the range of the instrument; but to increase the sensitiveness, as when demanded by progressive drying, the second tube 22 can be cut in on full voltage of the transformer by placing switch 19 into the position shown. For small installations however, one tube only would be sufficient, without a transformer.

In such instances, the measuring or hygroscopic element need consist merely of a thin glass or other impervious tube upon which the measuring wires are wound, and glass wool or its equivalent can be supported over or under the wires to provide moisture bridges between them, of conductivity variable with the humidity. Such an apparatus can be advantageously used for testing substances into which it can be immersed, as to test the amount of water in oil, or the humidity in powdered substances.

It is of course also possible to utilize direct in place of alternating current for the source 15. In that case however, it is advisable to make the measuring wires resistant to electroylytic corrosion, as by coating or plating them with noble metal, such as platinum or gold.

The apparatus can also be used in explosive gases or vapors, as in mines. In that case for the sake of protection against explosion, the measuring element 11—12—13 can be enclosed in fine wire nettings such as 23 as is commonly done in safety miner's lamps.

The humidity meter as above described can be used for many purposes, as in grain elevators, or warehouses for perishable goods, for drying equipment, or for ventilating equipment. It can be used at low as well as high temperatures.

In the appended claims, the term "filamentary" is used to designate a fibrous structure, such as of glass wool or its equivalent.

I claim:
1. A moisture measuring device, including a pair of spaced conductors, and non-conducting material connecting the conductors, said material being impervious to moisture but upon which moisture can collect.

2. In a moisture measuring device, a pair of spaced conductors, and glass wool connecting said conductors.

3. In a moisture measuring device, a pair of spaced conductors, and glass wool spread over the conductors so as to connect them at a multiplicity of points.

4. An electric hygrometer including a mass of non-conductive material incapable of being affected to become conductive due to humidity, but capable of holding moisture on its surface, and a pair of spaced conductors connecting said mass, whereby current can flow through said conductors under the influence of humidity.

5. In an electric hygrometer, a non-conductor support, a pair of closely spaced conductors on said support, said conductors being convoluted thereon so as to present to each other, considerable adjacent surfaces, and non-conducting material that is impervious to moisture connecting said conductors at a multiplicity of points, said material being capable of holding moisture on its surfaces for bridging the conductors.

6. The combination as set forth in claim 1 with the addition of a fine wire screen encompassing the device.

7. In an electric hygrometer, a support, a webbing of glass wool on the support, and a pair of closely spaced electrical conductors supported next the webbing so that said webbing connects the conductors at a multiplicity of points.

8. A humidity meter, including a pair of spaced conductors, and insulation material impervious to moisture, connecting said conductors at a large number of separate points.

9. A humidity meter, including a pair of spaced conductors, and a mass of filamentary insulation material impervious to moisture but upon which moisture can collect, connecting said conductors.

In testimony whereof I have hereunto set my hand.

WALTER LUBACH.